US009208110B2

(12) United States Patent
Safranek et al.

(10) Patent No.: US 9,208,110 B2
(45) Date of Patent: Dec. 8, 2015

(54) RAW MEMORY TRANSACTION SUPPORT

(75) Inventors: Robert J. Safranek, Portland, OR (US); Robert G. Blankenship, Tacoma, WA (US); Zhong-Ning Cai, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 13/994,130

(22) PCT Filed: Nov. 29, 2011

(86) PCT No.: PCT/US2011/062317
§ 371 (c)(1),
(2), (4) Date: Jun. 14, 2013

(87) PCT Pub. No.: WO2013/081580
PCT Pub. Date: Jun. 6, 2013

(65) Prior Publication Data
US 2013/0268711 A1    Oct. 10, 2013

(51) Int. Cl.
*G06F 13/40*    (2006.01)
*G06F 13/16*    (2006.01)

(52) U.S. Cl.
CPC ............ *G06F 13/1663* (2013.01); *G06F 13/16* (2013.01); *G06F 13/40* (2013.01); *G06F 13/4004* (2013.01); *G06F 13/4022* (2013.01)

(58) Field of Classification Search
CPC . G06F 13/1663; G06F 13/4004; G06F 13/40; G06F 13/16; G06F 13/4022
See application file for complete search history.

(56) References Cited

U.S. PATENT DOCUMENTS

| 7,600,091 | B2 | 10/2009 | Brittain et al. |
| 2003/0204636 | A1 | 10/2003 | Greenblat et al. |
| 2005/0021871 | A1 | 1/2005 | Georgiou et al. |
| 2005/0091432 | A1 | 4/2005 | Adams et al. |
| 2006/0277355 | A1 | 12/2006 | Ellsberry |
| 2009/0164739 | A1* | 6/2009 | Harikumar et al. ........... 711/153 |

(Continued)

FOREIGN PATENT DOCUMENTS

| WO | 2013/081580 A1 | 6/2013 |
| WO | 2013/103339 A1 | 7/2013 |

OTHER PUBLICATIONS

Kottapalli, Sailesh et al. "Nehalem-EX CPU Architecture". Hot Chips 2009. Sep. 10, 2009. Copyright 2008 Intel Corporation.*

(Continued)

*Primary Examiner* — Thomas J Cleary
(74) *Attorney, Agent, or Firm* — Law Office of R. Alan Burnett, P.S.

(57) ABSTRACT

Methods, systems, and apparatus for implementing raw memory transactions. An SoC is configured with a plurality of nodes coupled together forming a ring interconnect. Processing cores and memory cache components are operatively coupled to and co-located at respective nodes. The memory cache components include a plurality of last level caches (LLC's) operating as a distributed LLC and a plurality of home agents and caching agents employed for supporting coherent memory transactions. Route-back tables are used to encode memory transactions requests with embedded routing data that is implemented by agents that facilitate data transfers between link interface nodes and memory controllers. Accordingly, memory request data corresponding to raw memory transactions may be routed back to requesting entities using headerless packets.

20 Claims, 9 Drawing Sheets

(56) References Cited

U.S. PATENT DOCUMENTS

| | | | |
|---|---|---|---|
| 2009/0177853 A1 | 7/2009 | Mazzola et al. | |
| 2011/0072193 A1 | 3/2011 | Yeh | |
| 2011/0153924 A1* | 6/2011 | Vash et al. | 711/105 |
| 2012/0047333 A1* | 2/2012 | Kottapalli et al. | 711/146 |
| 2012/0079210 A1* | 3/2012 | Chinthamani et al. | 711/143 |
| 2013/0151782 A1* | 6/2013 | Liu et al. | 711/130 |
| 2013/0311804 A1* | 11/2013 | Garg et al. | 713/320 |
| 2013/0311817 A1* | 11/2013 | Kim et al. | 713/501 |
| 2013/0346816 A1* | 12/2013 | Menon et al. | 714/727 |
| 2014/0189239 A1* | 7/2014 | Hum et al. | 711/122 |
| 2014/0195833 A1* | 7/2014 | Wang et al. | 713/320 |
| 2015/0006776 A1* | 1/2015 | Liu et al. | 710/113 |

OTHER PUBLICATIONS

Nagaraj, Dheemanth et al. "Westmere-EX: A 20 thread server CPU". Hot Chips 2010. Copyright 2008 Intel Corporation.*

International Search Report and Written Opinion received for PCT Application No. PCT/US2011/062317, mailed on Jul. 31, 2012, 10 pages.

International Search Report received for PCT Application No. PCT/US2012/020175, mailed on Sep. 20, 2012, 2 pages.

Maddox et al., "Weaving High Performance Multiprocessor Fabric", Architectural insights into the Intel QuickPath Interconnect, Digital Edition, Version 1.0, Jul. 2009, 328 pages.

International Preliminary Report on Patentability and Written Opinion received for PCT Patent Application No. PCT/US2011/062317, mailed on Jun. 12, 2014, 7 pages.

International Preliminary Report on Patentability and Written Opinion received for PCT Patent Application No. PCT/US2012/020175, mailed on Jul. 17, 2014, 7 pages.

* cited by examiner

RAW MEMORY TRANSACTION SUPPORT

FIELD OF THE INVENTION

The field of invention relates generally to computer system interfaces and, more specifically but not exclusively relates to techniques for facilitating raw memory transactions for System on a Chip (SoC) architectures.

BACKGROUND INFORMATION

Computer systems typically employ one or more interconnects to facilitate communication between system components, such as between processors and memory. Interconnects and/or expansion interfaces may also be used to support built-in and add on devices, such as IO (input/output) devices and expansion cards and the like. For many years after the personal computer was introduced, the primary form of interconnect was a parallel bus. Parallel bus structures were used for both internal data transfers and expansion buses, such as ISA (Industry Standard Architecture), MCA (Micro Channel Architecture), EISA (Extended industry Standard Architecture) and VESA Local Bus. In the early 1990's Intel Corporation introduced the PCI (Peripheral Component Interconnect) computer bus. PCI improved on earlier bus technologies by not only increasing the bus speed, but also introducing automatic configuration and transaction-based data transfers using shared address and data lines.

As time progressed, computer processor clock rates where increasing at a faster pace than parallel bus clock rates. As a result, computer workloads were often limited by interconnect bottlenecks rather than processor speed. Although parallel buses support the transfer of a large amount of data (e.g., 32 or even 64 bits under PCI-X) with each cycle, their clock rates are limited by timing skew considerations, leading to a practical limit to maximum bus speed. To overcome this problem, high-speed serial interconnects were developed. Examples of early serial interconnects include Serial ATA, USB (Universal Serial Bus), FireWire, and RapidIO.

Another standard serial interconnect that is widely used is PCI Express, also called PCIe, which was introduced in 2004 under the PCIe 1.0 standard. PCIe was designed to replace older PCI and PCI-X standards, while providing legacy support. PCIe employs point-to-point serial links rather than a shared parallel bus architecture. Each link supports a point-to-point, communication channel between two PCIe ports using one or more lanes, with each lane comprising a bi-directional serial link. The lanes are physically routed using a crossbar switch architecture, which supports communication between multiple devices at the same time. As a result of its inherent advantages, PCIe has replaced PCI as the most prevalent interconnect in today's personal computers. PCIe is an industry standard managed by the PCI-SIG (Special Interest Group). As such, PCIe pads are available from many ASIC and silicon vendors.

Recently, Intel introduced the QuickPath Interconnect® (QPI). QPI was initially implemented as a point-to-point processor interconnect replacing the Front Side Bus on platforms using high-performance processors, such as Intel® Xeon®, and Itanium® processors. QPI is scalable, and is particularly advantageous in systems having multiple processors employing shared memory resources. QPI transactions employ packet-based transfers using a multi-layer protocol architecture. Among its features is support for coherent transaction (e.g., memory coherency).

A significant amount of I/O bandwidth is consumed by memory transactions. One approach that is currently employed to increase memory transaction bandwidth is to employ a Fully Buffered DIMM (or FB-DIMM) architecture, which introduces an advanced memory buffer (AMB) between a memory controller and a memory module. Unlike the parallel bus architecture of traditional DRAMs, an FB-DIMM has a serial interface between the memory controller and the AMB. This enables an increase to the width of the memory without increasing the pin count of the memory controller beyond a feasible level. With this architecture, the memory controller does not write to the memory module directly; rather it is done via the AMB. The AMB can thus compensate for signal deterioration by buffering and resending the signal. In addition, the AMB can also offer error correction, without posing an overhead on the processor or the memory controller. In addition to BF-DIMM. Intel has recently introduced the Intel® Scalable Memory Interconnect (SMI) and Scalable Memory Buffers (SMB). The integrated SMI offers high-speed serial links to the SMBs, which support cost-effective, commodity RDDR3 memory.

Other recent advancements include multi-core processors and System on a Chip (SoC) architectures. Rather than interfacing discrete components on a printed circuit board or through use of other package configurations, on an SoC multiple components are integrated onto a single integrated chip. SoCs offer a number of advantages, including denser packaging, higher speed communication between functional components, and lower temperature operation. SoC designs also provide standardization, scalability, modularization, and reusability.

Although SoC architectures are clearly the future direction of system designs, there are instances where it is still advantageous to keep some components on separate chips or dies. For example, it may be advantageous to have components with dedicated or specialized functions, such as memory controllers, on separate chips. At the same time, it would be desirable to support data transfer rates with such external components as if they were integrated on the SoC.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3a is a Hock schematic diagram of an SoC architecture employing a ring interconnect and implementing the distributed caching agent architecture of FIG. 2a;

FIGS. 10*a*-*c* show exemplary configurations of packets used to facilitate memory transactions, according to one embodiment.

DETAILED DESCRIPTION

Figure 1:
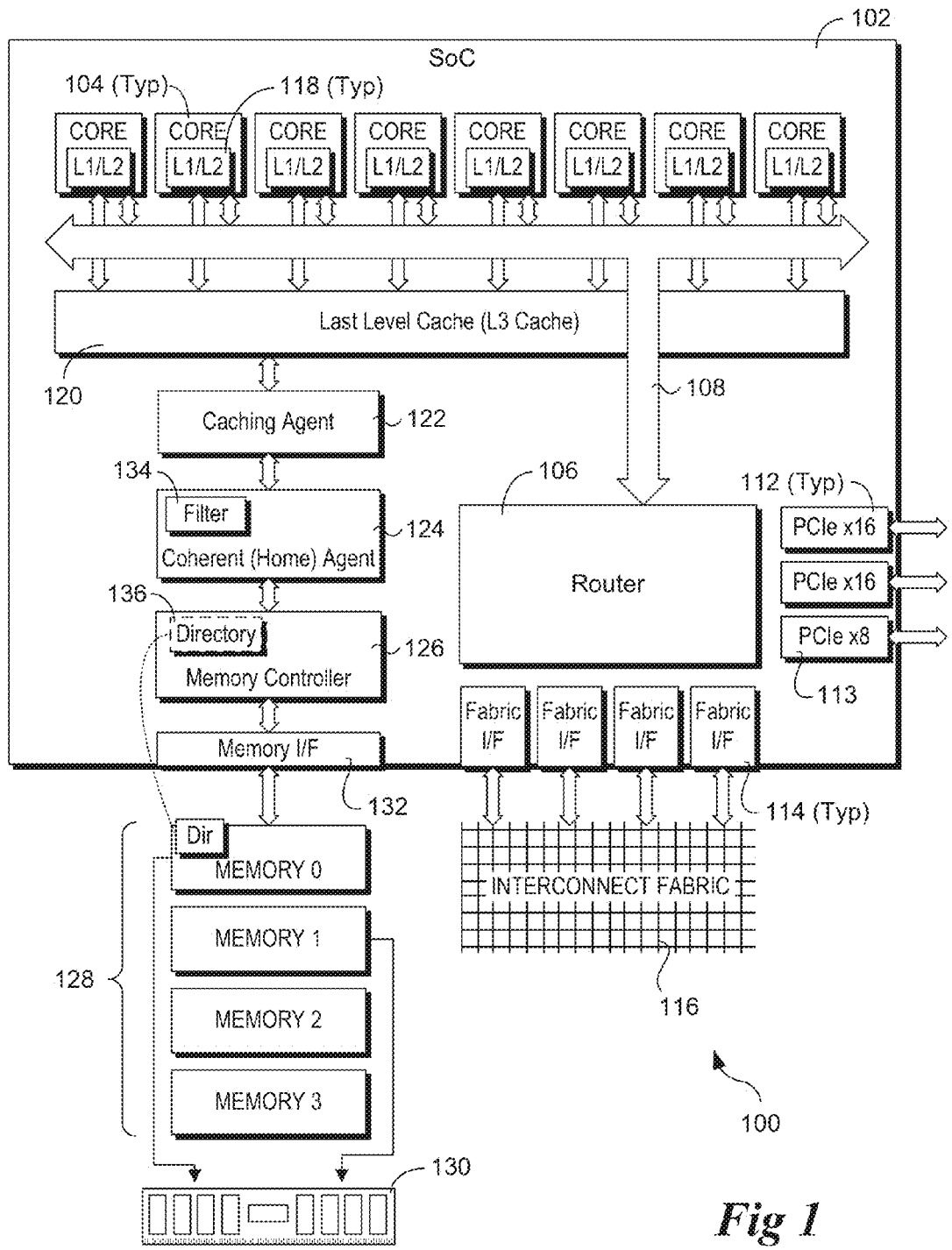
FIG. 1 is a block schematic diagram of a system architecture depicting selected components of an SoC and various external interfaces.

Embodiments of methods, systems, and apparatus for implementing raw memory transactions and associated protocols are described herein. In the following description, numerous specific details, such as implementations employing Keizer Technology interconnect (KTI) interconnects and protocols, are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. For example, the labeling of the nodes in various Figures provides information identifying the node and/or its function; such information cannot be conveyed alone with separate reference numbers. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity.

FIG. 1 is a block schematic diagram illustrating selected components and interfaces according to a system architecture 100. Most of the components for the system architecture are implemented on an SoC 102, which depicts an abstracted block-level view of selected components and functional blocks common to many SoC architectures. These components include multiple processor cores 104, which provide the primary processing operations of the SoC. While the exemplary configuration shown in SoC 102 depicts 8 processor cores, it will be recognized that SoC 102 could include various number of processor cores, such as 1, 2, 4, 6, 8, 10, 12, etc. Each of processor cores 104 are connected to a router block 106 via an internal interconnect 108. The router block 106 and internal interconnect 108 are generally representative of various circuitry that supports communication between components in SoC 102, including busses, serial point-to-point links, and interconnect fabrics, as applicable. Further details of such connections are not shown so as to not obscure the detail of system architecture 100.

A typical SoC will include various interfaces for communication with components external to the SoC, such as disk drives and other input/output (I/O) devices, network interfaces, BIOS/firmware, and peripheral devices, as well as other SoC's that may be coupled to SoC 102 via CPU socket-to-socket interconnects or other forms of interconnects used for communication between SoCs. Some of the interfaces for facilitating communication to the external components include various PCIe interconnects, generally depicted as double-arrowed x16 PCIe interfaces 112 with a corresponding box labeled x16 (indicating a link width of 16 lanes), and x8 PCIe interfaces 113 with a corresponding box labeled x8 (indicating a link width of 8 lanes). However, the link widths and numbers of the PCIe interfaces are merely exemplary, as the actual links may be between 1 and 32 (x32) lanes wide. The PCIe interfaces are used for interfacing with various peripheral and system components, such as PCIe expansion slots, video cards, video chips, etc.

SoC 102 also includes various fabric interfaces (I/F) 114. In general, fabric interfaces may be connected to an interconnect fabric, such as interface fabric 116 shown in FIG. 1, or to one or more point-to-point interconnect links. Although interface 116 is shown as a single block for convenience, it will be understood that a given fabric interface 116 may be connected to an interconnect fabric or link that is specific to only that fabric interface, or to an interconnect fabric that is accessible via other one or more other fabric interfaces.

The remaining components shown in system architecture 100 pertain to memory access, caching, and coherency. It is also common to have multiple levels of caches, with caches closest to the processor core having the least latency and smallest size, and the caches further away being larger but having more latency. For example, a typical configuration might employ first and second level caches, commonly referred to as L1 and L2 caches. Another common configuration may further employ a third level or L3 cache.

In the context of system architectures disclosed herein, the highest level cache is termed the Last Level Cache, or LLC. For example, the LLC for a given core may typically comprise an L3-type cache if L1 and L2 caches are also employed, or an L2-type cache if the only other cache is an L1 cache. Of course, this could be extended to further levels of cache, with the LLC corresponding to the last (i.e., highest) level of cache.

The caches shown in architecture 100 include a first level (L1) and a second level (L2) cache (as depicted by L1/L2 blocks 118) that are "private" to each processor core 104. Each of processor cores 104 is also connected to an L3 cache comprising a last level cache (LLC) 120. Last level cache 120 is depicted as a single logical block in FIG. 1; however, as explained in further detail below, components relating to last level cache 120 may be distributed on the SoC rather than implemented as a single monolithic block or box.

SoC 102 also includes a caching agent 122 coupled to a coherent agent 124 (also referred to as a "home" agent), which in turn is connected to a memory controller 126. The caching agent 122, home agent 124, and memory controller 126 work in concert to manage access to system memory 128, which is shown as comprising four memory blocks 0-3. Memory blocks 0-3 represent a logical partitioning of memory resources that are accessed via memory controller 126. The actual physical memory is stored on one or more memory modules 130 and accessed from memory controller 126 via a memory interface 132. For example, in one embodiment memory interface 132 includes one or more DDR interfaces, such as DDR3 interfaces.

Home agent 124 interacts with caching agent 122 to manage cache line usage by the various memory consumers (e.g., processor cores 104). In particular, these entities support a coherent memory scheme under which memory can be shared in a coherent manner without data corruption. To support this functionality, home agent 124 employs a cache filter 134, and the caching and home agent access and update cache line usage data stored in a directory 136, which is logically depicted in memory controller 126 (i.e., part of the logic employed by memory controller relates to usage of directory 136 data) but whose data will typically be stored in system memory 128.

Figure 2A:
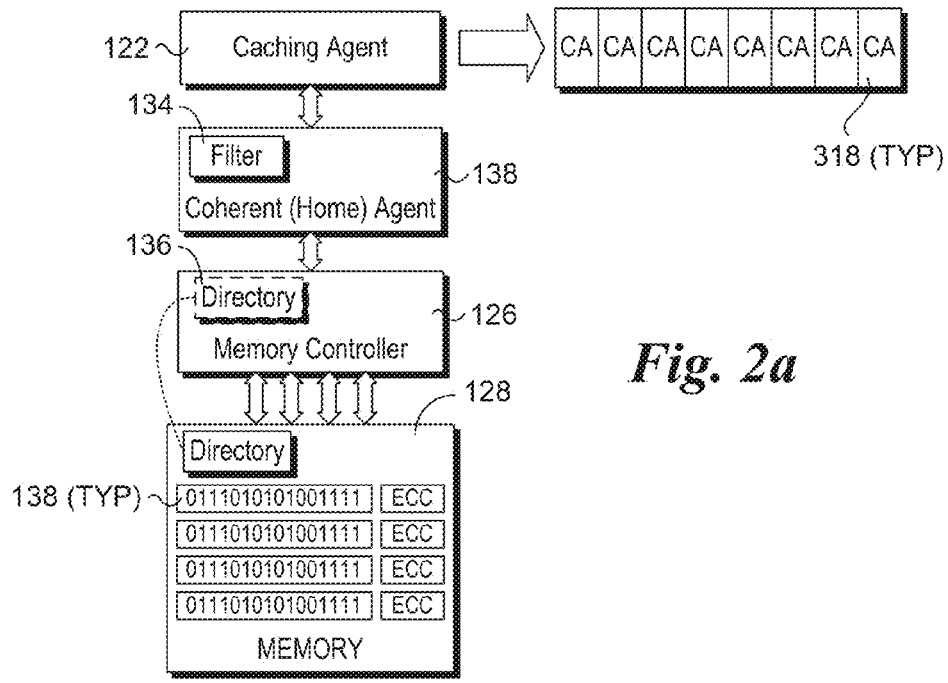
FIG. 2a is a block diagram illustrating selected components from the system architecture of FIG. 1 related to supporting memory transactions via use of distributed caching agents.
Figure 3A:
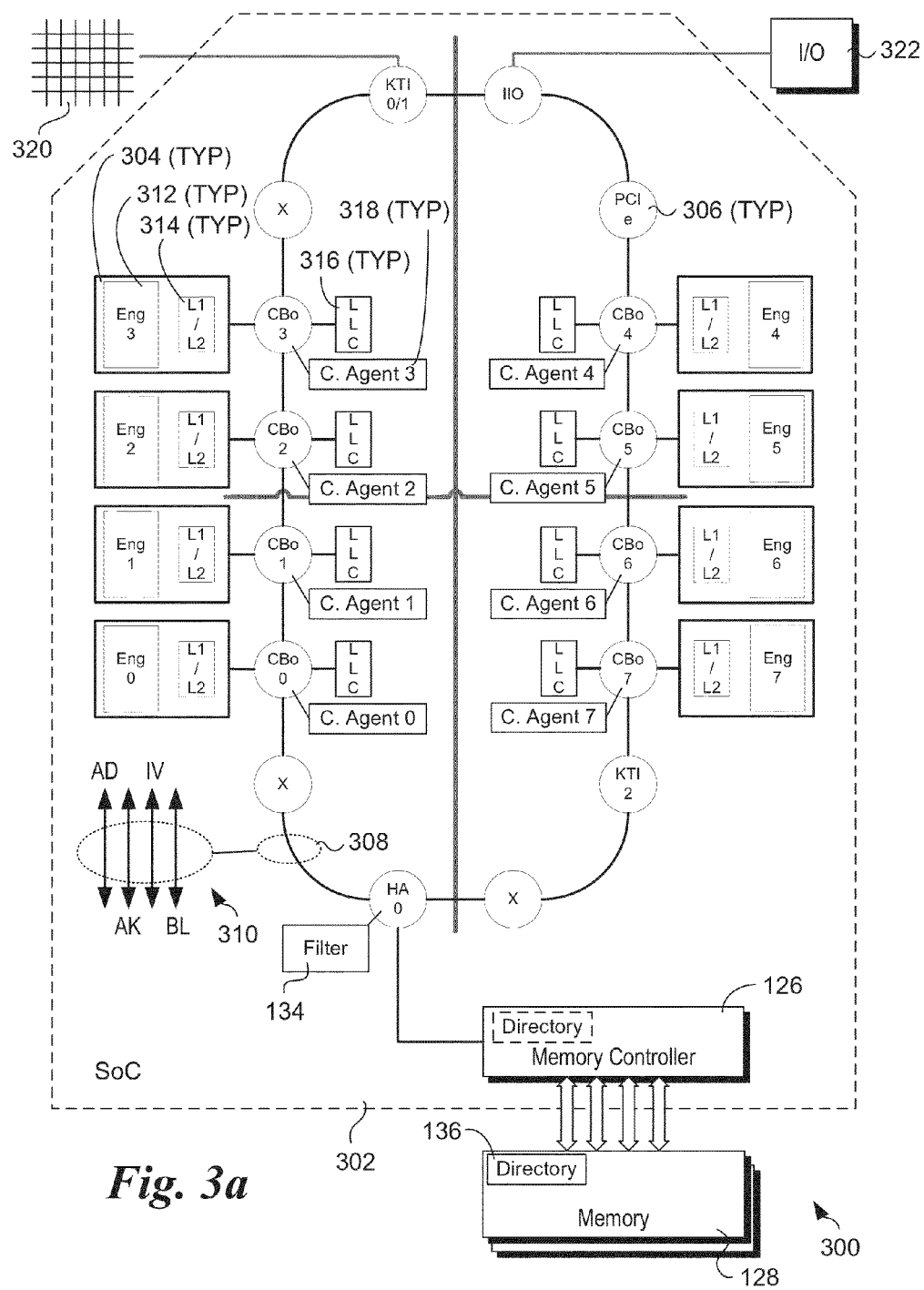

FIG. 2a shows further details of selected memory-related components of FIG. 1, while FIG. 3a shows an exemplary SoC architecture 300 in which these components may be implemented. As depicted in FIG. 2a, caching agent 122 is shown to be divided into a plurality of "slices." As discussed below, caching agent 122 may be implemented in a distributed manner under which each caching agent slice is associated with a corresponding processor core and LLC "slice" and supports cache coherency operations associated with memory accesses for that core. At the same time, the plurality of caching agent slices work cooperatively in a manner under which the caching agent functionality is managed on a system-wide level.

FIG. 2a also shows further details of memory 128, including multiple cache lines 138. Each cache line is further depicted to include an error correction code (ECC) portion. In one embodiment, each cache line comprises 64 data bits plus 8 ECC bits for a total of 72 bits. Access to the cache lines is managed by a combination of caching agents, home agent 138, and memory controller 126 such that memory coherence is maintained.

FIG. 3a shows a system 300 under which the memory management schemes of FIGS. 1 and 2a may be implemented, according to one embodiment. System 300 is illustrative of an advanced system architecture implemented in an SoC 302 including multiple processor cores 304, each coupled to a respective node 306 on a ring interconnect 308. For simplicity, the nodes for ring interconnect 308 is shown being connected with a single line. As shown in detail 310, in one embodiment each of these ring interconnects include four separate sets of "wires" or electronic paths connecting each node, thus forming four rings for ring interconnect 308. In actual practice, there are multiple physical electronic paths corresponding to each wire that is illustrated. It will be understood by those skilled in the art that the use of a single line to show connections herein is for simplicity and clarity, as each particular connection may employ one or more electronic paths.

Each node labeled CBo n (where n is a number) is a node corresponding to a processor core sharing the same number n (as identified by the core's engine number n). In the exemplary architecture of FIG. 3a, there are eight processor cores including processor engines 0-7. However, this is merely exemplary, as the number of processor cores (and associated components described below) may generally comprise two or more processor cores. As with the processor cores of FIG. 1, each of processor cores 304 include an in L1/L2 cache 312 and a processor engine 314. Also connected to each CBo n node is an LLC cache "slice" 316 and a caching agent 318.

In the illustrated configuration of FIG. 2, each processor core 204 includes a processing engine 312 coupled to an L1 or L1/L2 (as shown) cache 314, which are "private" to that core. Also connected to each CBo n node and collocated with a respective processor core is an LLC cache "slice" 316 of a distributed LLC 120 and a caching agent 318. Under this distributed LLC scheme, each of the other processor cores has access to all of the distributed LLC cache slices. Under one embodiment, the distributed LLC is physically distributed among N cores using N blocks divided by corresponding address ranges. Under this distribution scheme, all N cores communicate with all N LLC slices, using an address hash to find the "home" slice for any given address. Suitable interconnect circuitry is employed for facilitating communication between the cores and the slices; however, such circuitry is not show in FIG. 3a for simplicity and clarity.

There are also other types of nodes shown in SoC 302 including KTI nodes 0/1 and 2, an IIO node, a PCIe node, and a home agent (HA) node 0. KTI node 0/1 is depicted as being coupled to a fabric interconnect 320. Moreover, in one embodiment, KTI node 0/1 provides KTI interface circuitry forming two separate KTI interfaces. The IIO node is operatively coupled to an Input/Output interface 322. Further shown are a number of nodes marked with an "X"; these nodes are used for timing purposes. It is noted that the KTI, IIO, PCIe and X nodes are merely exemplary of one implementation architecture, whereas other architectures may have more or less of each type of node or none at all. Moreover, other types of nodes (not shown) may also be implemented.

In one embodiment, data is passed between nodes in a cyclical manner. For example, for each real or logical clock cycle (which may span one or more real clock cycles), data is advanced from one node to an adjacent node in the ring. In one embodiment, various signals and data may travel in both a clockwise and counterclockwise direction around the ring. In general, nodes 306 may comprise buffered or unbuffered nodes. In one embodiment, at least some of nodes 306 are unbuffered.

Each of caching agents 318 is configured to perform messaging relating to signal and data initiation and reception in connection with a coherent cache protocol implemented by the system, wherein the caching agent handles cache-related operations corresponding to addresses mapped to its collocated LLC 316. In addition, in one embodiment home agent HA0 employs respective a filter 134, and the various caching and home agents access and update cache line usage data stored in a directory 136 that is implemented in a portion of memory 128. It will be recognized by those skilled in the art that other techniques may be used for maintaining information pertaining to cache line usage.

In the context of system 300, a cache coherency scheme may be implemented by using independent message classes. Under one embodiment of a ring interconnect architecture, independent message classes may be implemented by employing respective wires for each message class. For example, in the aforementioned embodiment, ring interconnect 308 includes four ring paths or wires, labeled and referred to herein as AD, AK, IV, and BL. Accordingly, since the messages are sent over separate physical interconnect paths, they are independent of one another from a transmission point of view.

Figure 2B:
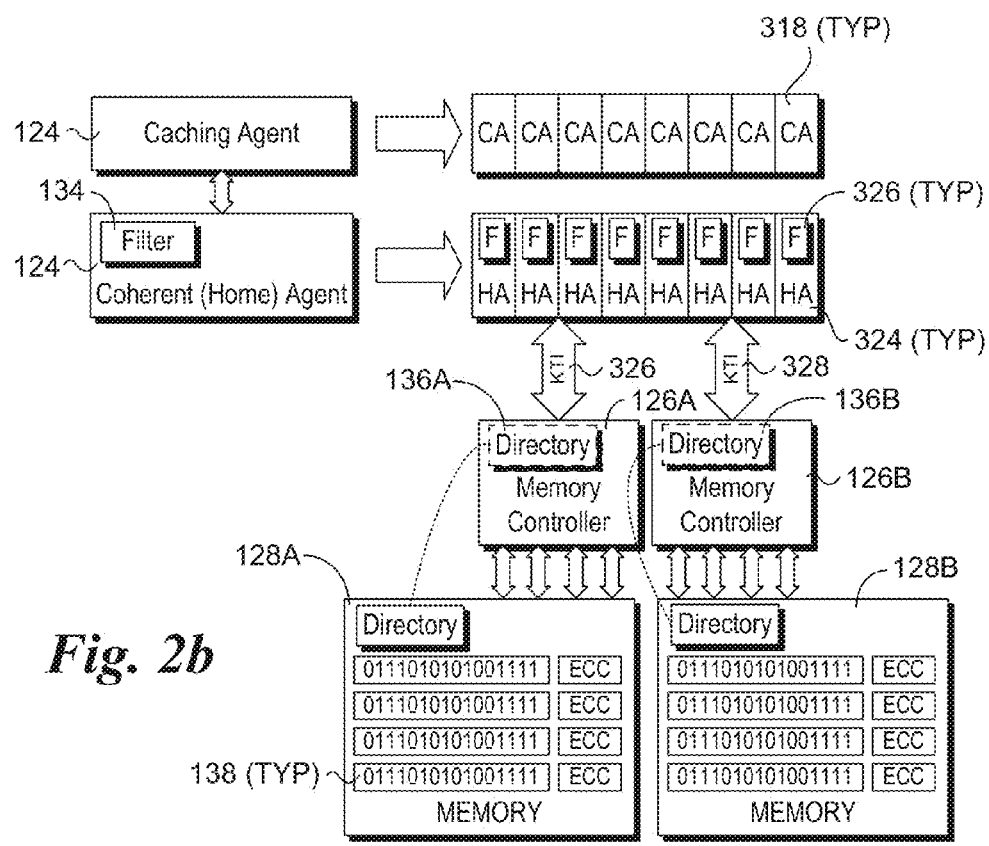
FIG. 2b is a block diagram depicting an augmentation to the architecture of FIG. 2a further including the use of distributed home agents that are operatively coupled to memory controllers via KTI links.
Figure 3B:
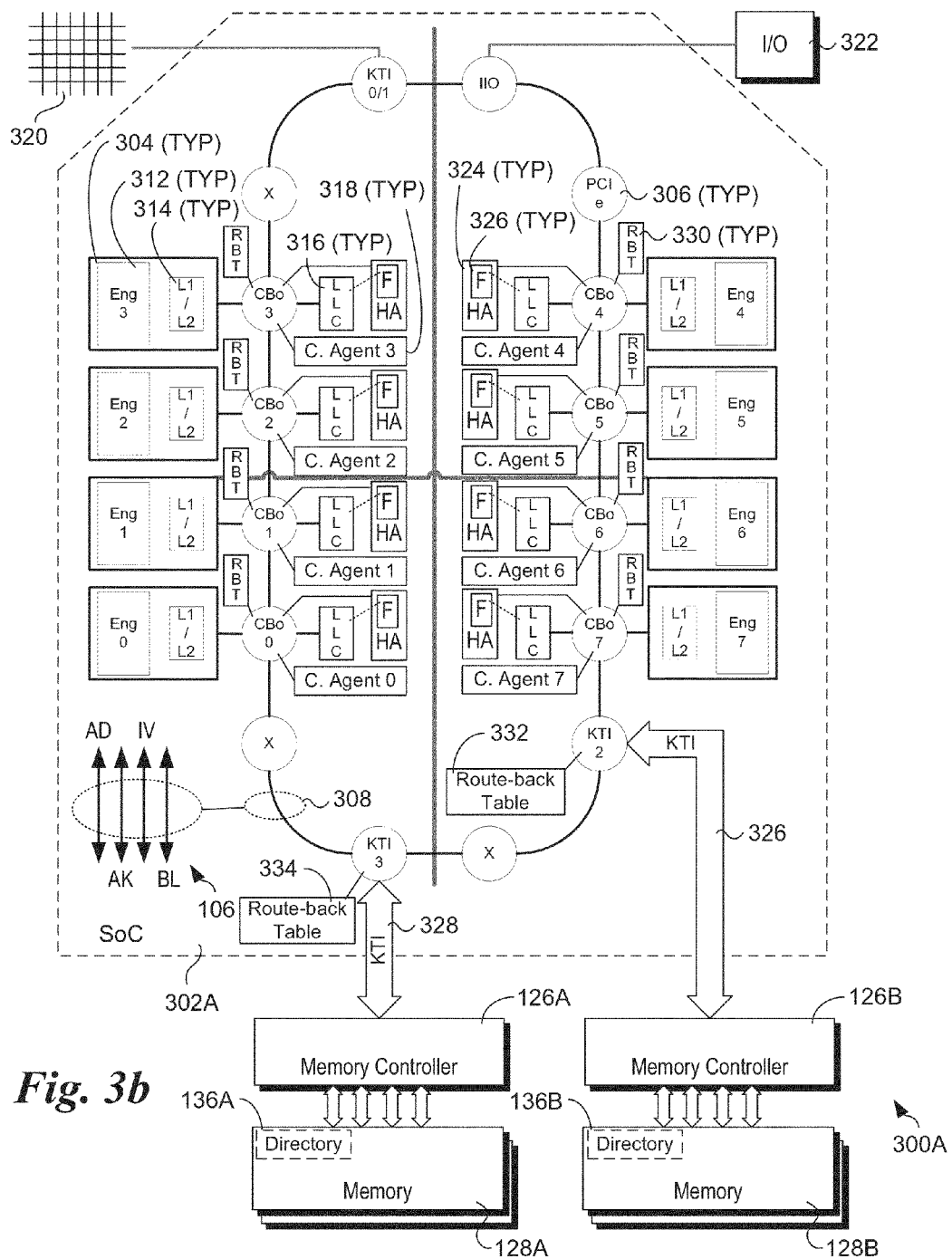
FIG. 3b is a block schematic diagram of an SoC architecture employing a ring interconnect and implementing the distributed home agent architecture of FIG. 2b.

FIGS. 2b and 3b show details of a system 300A comprising an augmentation of system 300 of FIGS. 2a and 3a that employs distributed home agents 324 on an SoC 302A. As shown in FIG. 3b, each home agent 324 is collocated with a respective caching agent 318 and LLC 316. Similarly, each home agent 324 is operationally coupled to a respective processor core 304. In one embodiment, caching agents and home agents are implemented via a common circuit block or box, or are otherwise considered as a single logical component, which is referred to as a caching home agent or CHA (not shown).

Distributed home agents 324 are configured for performing memory coherency operations that are analogous to home agent 124 discussed above. However, in this instance, each home agent 324 is mapped to a portion or "slice" of memory (rather than a larger block), and that home agent is responsible for performing home agent operations associated with that portion of memory. Accordingly, the filtering function of the home agent is also distributed such that each home agent 324 includes a filter 326. In one embodiment, the filter data is stored the collocated LLC 316. In one embodiment, the portion of memory associated with a home agent comprises a portion of memory accessed by a single memory controller. In another embodiment, a home agent may be associated with multiple portions of memory accessed via respective memory controllers, e.g., a first portion accessed via a first memory controller, a second portion accessed via a second memory controller, etc.

Distribution and collocation of home agents 324 enables additional functionality to be implemented in architecture 300A, including access to memory controllers that may be off-chip (e.g., separate from SoC 302). Under one embodiment, this is facilitated by use of KTI links between KTI nodes on ring interconnect 308 and applicable memory controllers and KTI agents. For example, this is depicted in FIG. 3b as KTI links 326 and 328 between KTI node 2 and a KTI node 3 (which has replaced node HA0 in SoC 302A). Each of KTI links 326 and 328 links its KTI node with a respective memory controller 126A and 126B. Each of memory controllers 126A and 126B is used for controlling a respective memory 128A and 128B. In one embodiment, each of memory 128A and 128B includes a respective directory 136A and 136B. Under an alternative approach, directory information may be managed by a cache agent or a home agent rather than a memory controller.

As each of the processor cores executes its respective code, various memory accesses will be performed. The majority of these memory accesses will comprise memory READ operations. Moreover, for a given processor core, a significant portion of the memory READ operations will entail reading data stored in a system memory store, as opposed to reading memory that is stored in a cache level associated with another processor core. For example, well-architected applications and operating systems will employ a single thread for performing memory READ operations associated with a given document that is primarily targeted for viewing rather than editing, such as a PDF document or web page. This processing will typically involve either downloading the document data into a memory buffer (typically allocated as a portion of system memory) or reading document data from a document stored on a disk drive into a memory buffer. In turn, corresponding data will be "read" by the application thread by performing memory READ operations that enable the data to be accessed by the processor core associated with the thread. Similarly, memory READ operations are employed to load application code into processor core registers to be executed.

The net result of the foregoing is memory READ operations of content stored in system memory resources consume a significant portion of system I/O bandwidth. In addition, each memory READ operation has associated overhead that results in addition bandwidth consumption, particularly when considering the need for routing data to different components that may share access to the same memory, such as is common with multi-core, multi-level cache architectures.

In accordance with aspects of embodiments disclosed herein, techniques for performing enhanced READ memory access, referred to as raw memory transactions, are facilitated by employing "leaderless" packets that are routed to appropriate agents through the use of augmentations to the KTI protocol and corresponding KTI agents and interfaces. In further detail, memory transfers between KTI nodes and memory controllers are implemented via packet-based transactions without the use of the packet headers, thus freeing up the portion of a packet format normally reserved for routing information so that it may be used for requested memory payload data. To better understand how this may be implemented in embodiments employing KTI, an overview of KTI operations is now presented.

Overview of Keizer Technology Interconnect

Figure 4:
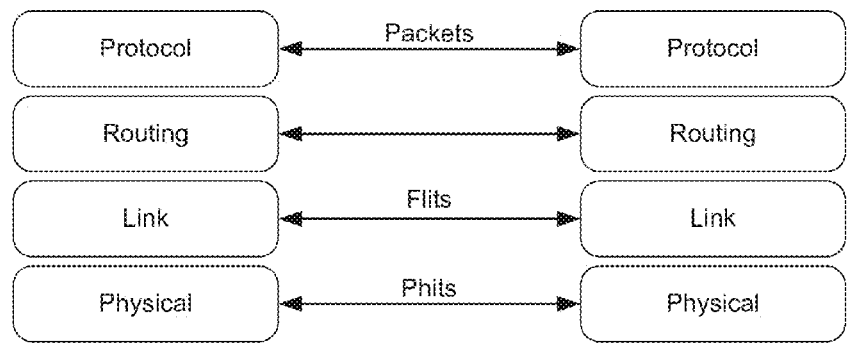
FIG. 4 shows the layers of the KTI protocol stack.

Keizer Technology Interface (KTI) is a recently developed interface and associated protocols that leverages some aspects of QPI and provides extended functionality. As with QPI, KTI transactions are facilitated via packetized messages transported over a multi-layer protocol. As shown in FIG. 4, the layers include a Physical layer, a Link layer, a Transport layer, and a Protocol layer. At the Physical layer, data is exchanged in phits (Physical Units). At the link layer phits are aggregated into flits (flow control units). At the Protocol layer, messages are transferred between agents using a packet-based transport.

Figure 5:
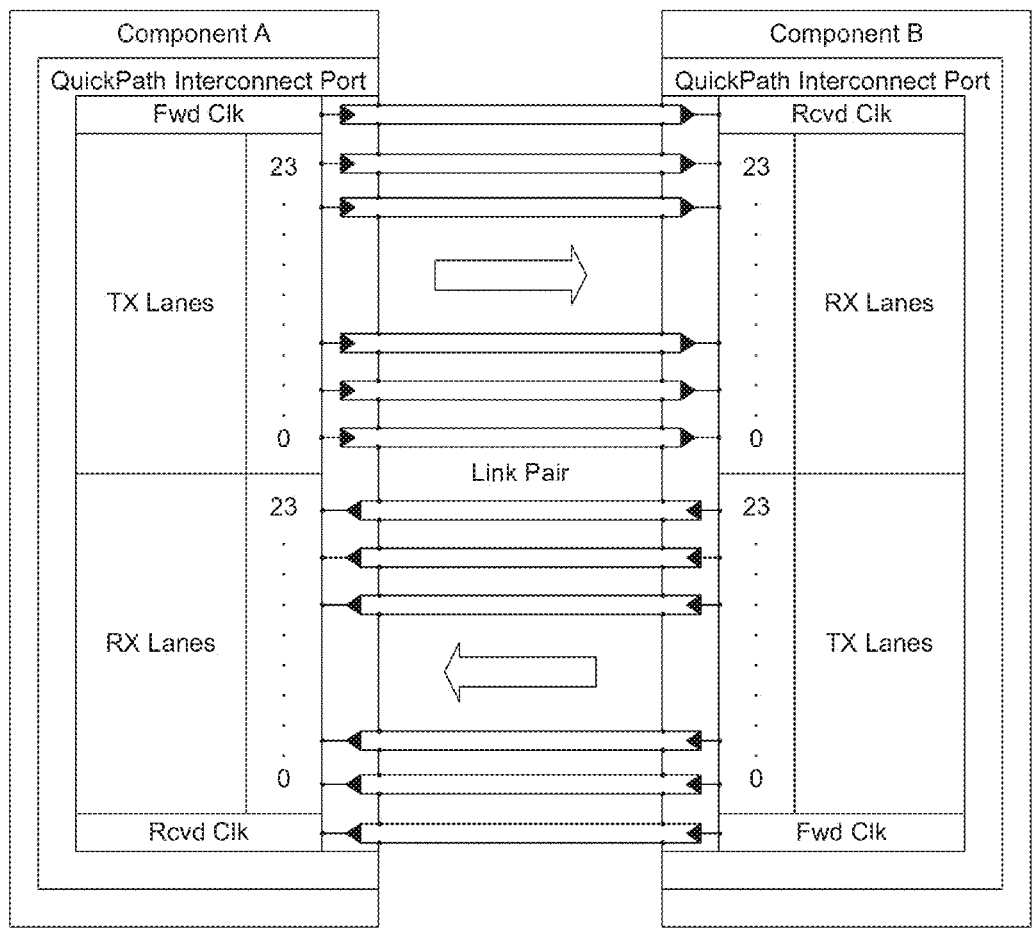
FIG. 5 is a schematic diagram illustrating the structure of a KTI link.

The Physical layer defines the physical structure of the interconnect and is responsible for dealing with details of operation of the signals on a particular link between two agents. This layer manages data transfer on the signal wires, including electrical levels, timing aspects, and logical issues involved in sending and receiving each bit of information across the parallel lanes. As shown in FIG. 5, in one embodiment the physical connectivity of each interconnect link is made up of twenty-four differential signal pairs plus a differential forwarded dock. Each differential signal pair comprises a "lane," and thus the embodiment of FIG. 5 employs 24 lanes. The user of 24 lanes is not limiting, as KTI implementation may employ other numbers of lanes, including 6, 8, 12, and 16 lanes. Each port supports a link pair consisting of two uni-directional links to complete the connection between two components. This supports traffic in both directions simultaneously.

Components with KTI ports communicate using a pair of uni-directional point-to-point links, defined as a link pair, as shown in FIG. 5. Each port comprises a Transmit (Tx) link interface and a Receive (Rx) link interface. For the illustrated example, Component A has a Tx port that is connected to Component B Rx port. One uni-directional link transmits from Component A to Component B, and the other link transmits from Component B to Component A. The "transmit" link and "receive" link is defined with respect to a specific KTI agent. The Component A transmit link transmits data from Component A Tx port to Component B Rx port. This same Component A transmit link is the Port B receive link.

The second layer up the protocol stack is the Link layer, which is responsible for reliable data transmission and flow control. The Link layer also provides virtualization of the physical channel into multiple virtual channels and message classes. After the Physical layer initialization and training is completed, its logical sub-block works under the direction of the link layer, which is responsible for flow control. From this link operational point onwards, the logical sub-block communicates with the Link layer at a flit granularity and transfers flits across the link at a phit granularity. A flit is composed of integral number of phits, where a phit is defined as the number of bits transmitted in one unit interval (UI).

Figure 6:
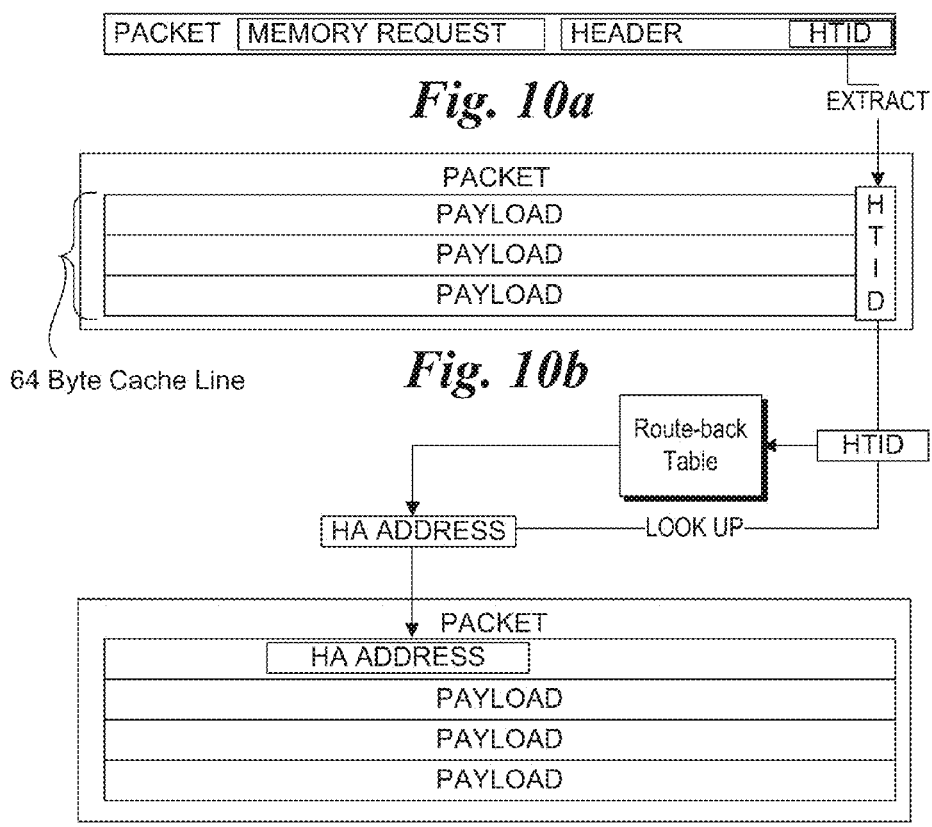
FIG. 6 shows a 192-bit flit employed in one embodiment of a KTI link.

In one embodiment shown in FIG. 6 employing 24 lanes, a phit comprises 24 bits, and a corresponding flit comprises 8 UI's for a total of 192 bits. In general, each KTI flit comprises 192 bits, with the number of bits in a phit and the number of LA's being a function of the number of lanes implemented for the KTI link.

The Routing layer is responsible for ensuring that messages are sent to their proper destinations, and provides the framework for directing packets through the interconnect fabric. If a message handed up from the Link layer is destined for an agent in another device, the Routing layer forwards it to the proper link to send it on. All messages destined for agents on the local device are passed up to the protocol layer.

The Protocol layer serves multiple functions. It manages cache coherence for the interface using a write-back protocol. It also has a set of rules for managing non-coherent messaging. Messages are transferred between agents at the Protocol level using packets. The Protocol layer manages delivery of messages across multiple links, involving multiple agents in multiple devices. The system's cache coherency across distributed caches and memory controllers is maintained by distributed agents that participate in coherent memory space transactions, subject to rules defined by the Protocol layer. The KTI coherency protocol supports home snoop coherency schemes.

Raw Memory Transactions

As discussed above, home agents are employed to support coherent memory management, including maintaining cache line status and cache line location for the memory address range(s) allocated to each cache agent. Under architectures employing a single home agent per SoC, updating of cache line status and location is managed by a single entity and thus cache line usage information pertaining to memory managed by the home agent are routed to the single home agent. Based on the home agent cache line status and location information (i.e., where cached copies of the cache line may be located), the corresponding cache line data is retrieved from an appropriate source (either memory or an applicable cache) and a copy of the cache line is returned to the original requester, also referred to herein as the requesting entity. This requires routing the cache line data back to the requester, which is facilitated using KTI routing techniques described above. However, in accordance with the embodiments of FIGS. 2h and 3b, the home agent operations are distributed in a manner that co-locates a home agent with a respective CBo (and corresponding processor core) and caching agent. As a result, rather than forwarding or otherwise maintaining cache line usage information at a single home agent, now such information is provided to or managed by a distributed set of home agents. At the same time, since the distributed home agents are co-located with processing cores at the CBo nodes, it is possible to tie the applicable home agents to corresponding memory transactions originating for CBo's and/or co-located processor cores.

One aspect of distributing and collocating home agents with caching agents and LLC slices is that transactions between a home agent and a memory controller (corresponding to cache lines managed by the home agent) do not need to include a routing address to the node to which the LLC is collocated. Rather, only the home agent needs to be identified, as explained in further detail below.

In one embodiment, routing information is implemented such that requested memory READ data is returned to the home agent of an applicable requestor without having to explicitly provide the routing information in the memory READ packets returned by a memory controller. This is facilitated, in part, through the use of a "route-back" table (RBT). The RIB contains home agent and CBo mapping information, along with other information used to generate Home Tracker Identifiers (HTIDs), which are included in the memory transaction requests and encoded such that the appropriate home agent to which a memory READ request result is to be returned can be readily identified.

Figures 7, 8:
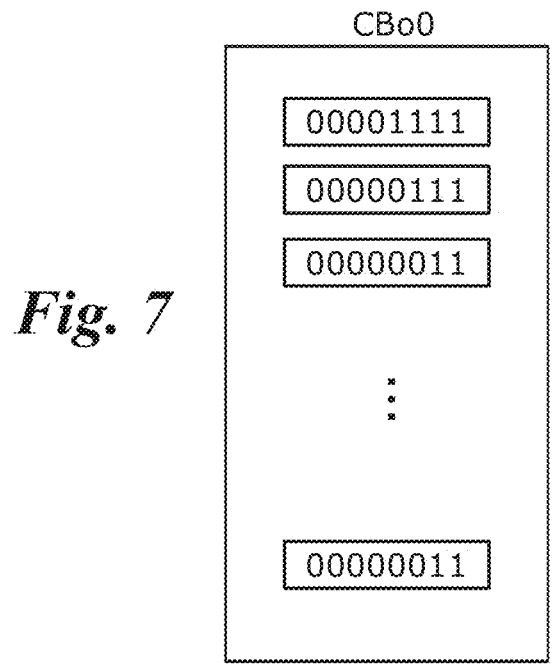
FIG. 7 depicts an exemplary HTID allocation table.
FIG. 8 depicts details of an exemplary route-back table.

FIG. 7 shows an exemplary HTID allocation pool for a CBo (in this example CBo0). In the illustrated embodiment, each entry comprises an 8-bit vector, with each bit representing whether or not an HTID is available for use (1) or not available (0). The use of an 8-bit vector is merely exemplary, as other length bit vectors may be employed, depending on the number of home agents and/or memory controllers, and the mappings between home agents and memory controllers.

FIG. 8 show further details of an exemplary Hill) mapping. FIG. 8 shows a mapping for a home agent HAn to CBo's 0-3, with each CBo being allocated an HTID pool of 8 HTIDs. For a given home agent, the HTIDs will be unique. The HTID is encoded to route incoming responses from memory READ requests on a KTI link to the home agent that originated the request.

In one embodiment there are two main modes—a static mode and a dynamic mode. Under the static mode, the RBI is pre-populated by the system BIOS during boot up, with the field values being static. Under the dynamic mode, contents of the RBT may be changed during run-time, depending on usage.

One use case for the dynamic mode is direct-to-core transactions. Under direct-to-core transactions, any core may send a request to any CBo. When using the direct-to-core mode, a KTI agent returns data directly to the HA for a requesting core (via the applicable CBo). Accordingly, KTI modules are configured to support route back to HA's. In one embodiment, this is implemented through use of a Ring Stop ID field in the RBT entry to hold the Ring Stop ID of the HA.

Returning to FIG. 3b, in one embodiment, a plurality of RBI instances 330 (i.e., a copy of a route-back table applicable to a given CBo) are depicted as being operatively coupled to a respective CBo. In addition, route-back tables 332 and 334 are operatively coupled to respective nodes KTI 2 and KTI 3, in general, applicable HTID data is looked-up in an RBT by a requesting entity (e.g., CBo or processor core) and embedded in an outbound memory transaction request. The HTID information is then processed by the KTI agents at nodes KTI 2 and KTI 3 (as applicable) to effect routing of memory request READ data returned from a memory source memory controller or cache) back to the requester via the ring interconnect.

The flow for a memory READ request transaction, according to one embodiment proceeds as follows. Referring to the flowchart of FIG. 9, the process starts in a block 900 with the caching agent for the memory requester (e.g., co-located processor core) to identify the home agent that "owns" the cache line(s) associated with the memory transaction request and sends a packet on the ring interconnect to that home agent. As discussed above, the home agents are distributed, with each home agent managing a corresponding portion of memory. Mapping data corresponding to portion of memory managed by each home agent is maintained by or otherwise accessible to each caching agent. Typically, the memory request will include an address or range of addresses corresponding to where the data is nominally located in a system memory resource. This address or address range is then used as an input by the caching agent to determine which home agent manages or "owns" the corresponding cache line(s). Once this HA is identified, the caching agent forwards the request in a packet that includes a destination or target address corresponding to that HA.

Upon receiving the packet, the home agent looks up information in its directory to locate a valid copy of the cache line, as depicted in a block 902. In general, a valid copy will be marked as E (Exclusive) or S (Shared) if using the MESI or MESIF cache coherency schemes. For this example it is presumed there are no copies of the cache lines within any cache level, and thus a copy of the cache line(s) needs to be retrieved from system memory.

For a request to access system memory, the home agent generates a KTI packet corresponding to the memory request including an HTID corresponding to the request and sends the packet to the KTI agent at the KTI node coupled to the memory controller associated with the home agent. These operations are shown in a block 904, with a simplified illustration of the corresponding packet shown in FIG. 10a. Recall that in addition to partitioning (i.e., distributing) portions of memory to the home agents, the portion of memory managed by each home agent is accessed via a corresponding memory controller. That is, there is a 1:1 mapping between each home agent and its associated memory controller which is used to access the portion of memory managed by that home agent. Since that memory controller is accessed via a single KTI node (and corresponding KTI agent), the home agent will be configured to send memory requests to that KTI node.

Next, in a block 906, the KTI agent at the KU node processes the packet and generates a raw memory READ request as a KTI packet including the HTID and sends it to the memory controller over the KTI link between the KU node and the memory controller. In response, in a block 908 the KTI agent at the memory controller returns cache line data corresponding to the memory request as one or more "headerless" packets with an embedded HTID back to the KTI agent at the KTI node. For example, FIG. 11 shows an example of a headerless packet comprising three 192-bit flits with an embedded HTID, while FIG. 10b depicts an abstracted version of the same headerless packet.

In further detail, FIG. 1 depicts a headerless packet format 800, including KTI Flits 800-1, 800-2, and 800-3, via which a 64 byte cache line can be transferred in accordance with one embodiment of a raw memory transaction. One aspect of the headerless packet format is the encoding of the HTID associated with the transaction in lane L2. As shown, the HTID comprises a 10-bit value, with bits [9:8] and [7:6] being encoded in KTI Flit 800-1, bits [5:4] being encoded in KTI Flit 800-2, and bits [3:0] encoded in KTI Flit 800-3. Lane L2 further includes the following encodings. Each of KTI Flits 800-1, 800-2, and 800-3 include an JIB Or bit. Data Byte 31 is split across KTI Flits 800-1 and 800-2 as shown. KTI Flit 800-3 further includes two directory bits and a poison bit. The 64 byte cache line data, absent Data Byte 31, is contained in lanes L3-L23, as shown. In addition, lanes L0 and L1 are used for 16 bit CRC's.

Figure 11:
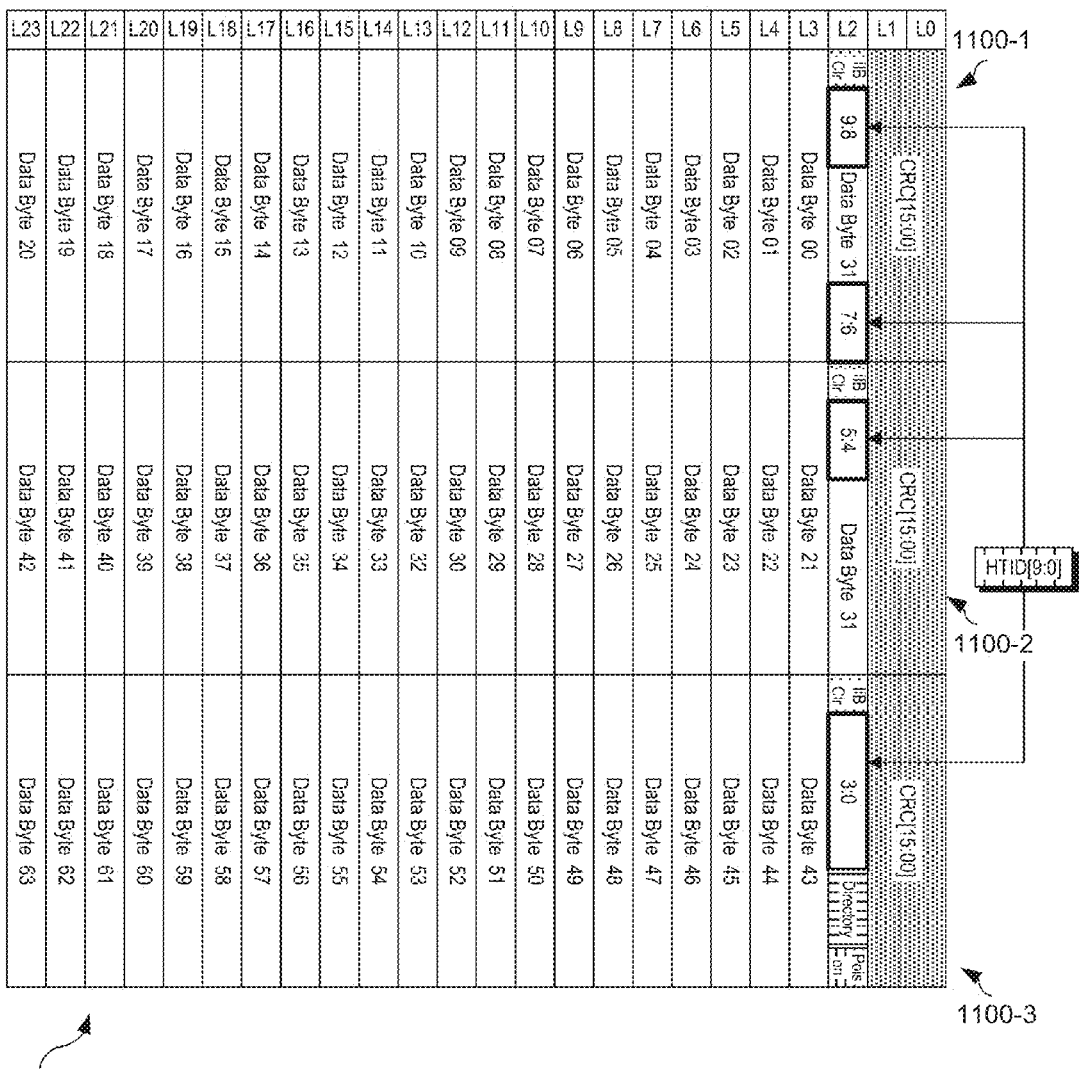
FIG. 11 shows an exemplary leaderless packet comprising three 192-bit KTI flits.

The packet of FIG. 11 is deemed headerless because it does not employ a header as would be normally recognized in a KTI packet or other formats used for packetized data. Rather, the HTID value is encoded across three flits using lane L2. Since the smallest logical unit of data transfer under KTI is a flit (and thus the use of a header requires a corresponding flit), the headerless packet scheme provides a 33% improvement in data transfer rate since a full 64-byte cache line can be transferred using only three flits rather than the four flits that would be required using a packet with a header.

Headerless data packets are detected by their format, which substantially differs from other types of KTI packets employing headers. In order to perform proper actions, various bits associated with KTI packet handling that are not present in the headerless data packets are implied. Details of the various types and numbers of bits, including the implied bits, for one embodiment of a headerless KTI packet are shown in TABLE 1 below.

TABLE 1

| Headerless Data Flit 0-2 (and embedded header information bits) | |
| --- | --- |
| Data bits | 512 |
| CRC | 48 |
| IIB | 3 |
| Directory | 2 |
| Ack | 0 |
| Crd | 0 |
| Poison | 1 |
| RTID | 10 |
| Total Bits | 576 |

Additional implied bits in headerless data packet:

Crd = VNA of 1
Ack = 1+
VNT = VNA
MC/Opcde = MemData
VN/NID unused in SMI3 mode (filled as all zeros)
Poison on First chunk is assumed clear. Poison cases must use full header.

Figure 9:
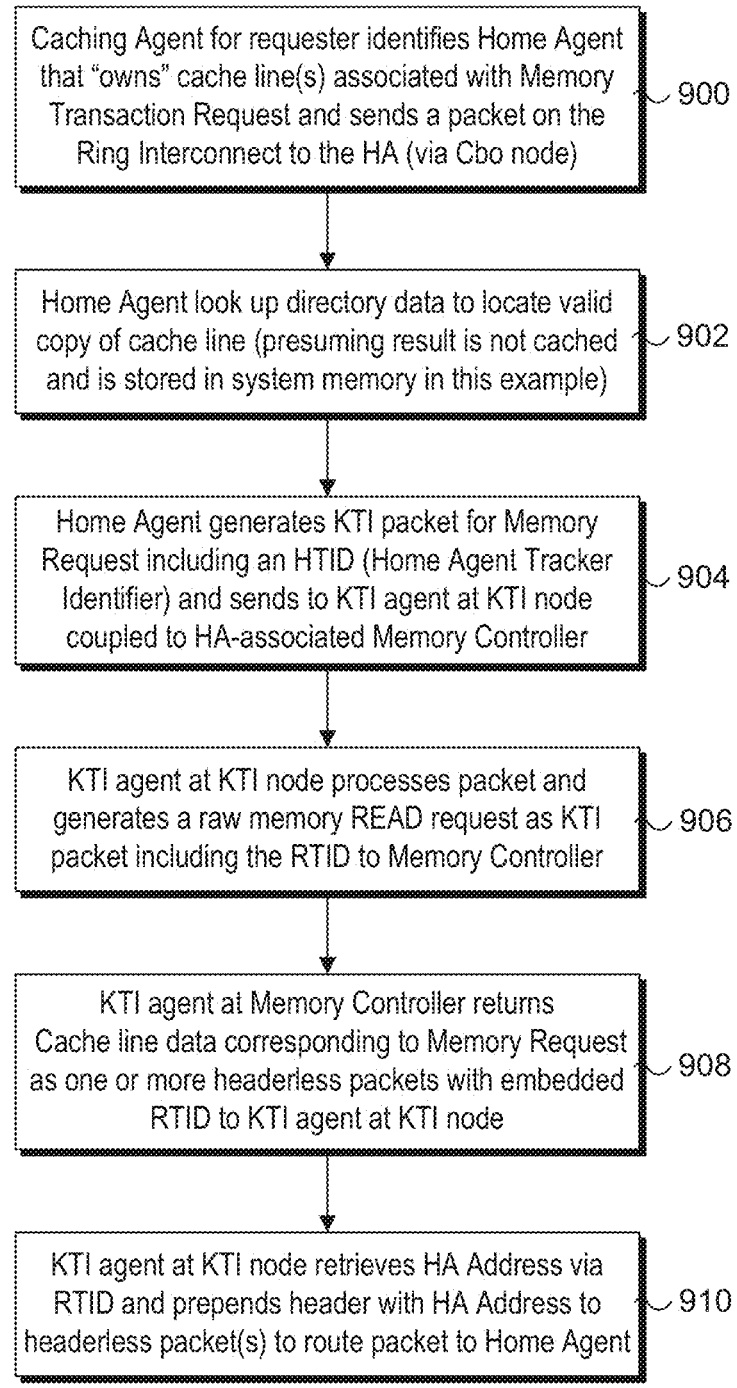
FIG. 9 shows a flowchart illustrating operations performed in connection with a raw memory READ transaction, according to one embodiment.

Returning to the flowchart of FIG. 9, in a block 9010 the KTI agent at the KTI node receives the requested data as one or more cache lines transferred as one or more respective headerless packets. The KTI agent then decodes the HTID and uses the HTID as an input to its route-back table to identify the corresponding home agent for the request. The KTI agent then generates a header including the home agent address in a fourth flit that is pre-pended to the three other flits containing the cache line data and the corresponding packet is routed back to the home agent via the ring interconnect. At this point the home agent carries out various cache line coherency operations in accordance with the KTI memory coherency protocol.

First a core sends a request to its CA. In response, the CA checks its cache levels to see if the corresponding cache line(s) are already cached locally. If the cache line(s) are not in a local cache, the request is passed to the HA that owns the corresponding cache line(s), which then generates a memory request packet and sends the request to an applicable KTI agent (using the address of a corresponding KTI node). The KTI agent looks up the RBT and populates the entry's Ring Stop ID field of the HA. The returning response performs the same look-up at the KTI agent and thus knows where to return the data. As a result, memory READ data returned from a memory controller coupled to a KTI node on the ring does not have to include explicit routing information.

The above description of illustrated embodiments of the invention, including what is described in the Abstract, is not intended to be exhaustive or to limit the invention to the precise forms disclosed. While specific embodiments of and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A System on a Chip (SoC), comprising:
   a ring interconnect having a plurality of nodes;
   a plurality of processor cores, each operatively coupled to a respective node;
   a plurality of caching agents, each operatively coupled to a respective processor core;
   a plurality of last level cache (LLC) slices, each LLC slice associated with a respective caching agent;
   a plurality of distributed home agents, each operatively coupled to a respective node; and
   a first interconnect link interface, operatively coupled to a first interconnect interface node and configured to support an interface between the first interface node and a memory controller.

2. The SoC of claim 1, wherein the first interconnect link interface is configured to interface to a memory controller that is external to the SoC.

3. The SoC of claim 1, wherein the first interconnect link interface employs a packet-based protocol to communicate with the memory controller.

4. The SoC of claim 1, wherein the packet-based protocol is based on the Keizer Technology Interconnect (KTI) protocol.

5. The SoC of claim 1, wherein the SoC supports memory transactions between the first interconnect link interface and a memory controller using a packet-based protocol implementing headerless packets.

6. The SoC of claim 1, further comprising:
   a second interconnect link interface, operatively coupled to one of the first interconnect interface node or a second interconnect interface node and configured to support an interface between one of the first interconnect interface node or the second interconnect interface node and a second memory controller.

7. The SoC of claim 1, wherein a home agent and a corresponding caching agent are implemented as a single logical component.

8. The SoC of claim 1, wherein the plurality of LLC slices are managed as a single distributed last level cache.

9. The SoC of claim 1, further comprising at least one route-back tables containing information for routing memory transaction request data back to a home agent associated with a corresponding memory transaction.

10. The SoC of claim 9, wherein a route-back table contains data including transaction identifiers that are encoded to identify at least one of a home agent or node to which the home agent is operatively coupled.

11. A method, comprising:
   implementing a memory coherency protocol in a computer system having a system on a chip (SoC) having a plurality of nodes connected to form a ring interconnect, a portion of the plurality of nodes having a processor core operatively coupled thereto; and
   employing a plurality of home agents to effect memory coherency operations associated with the memory coherency protocol, wherein each home agent is associated with a respective processor core.

12. The method of claim 11, further comprising implementing memory transactions using packetized messages between a link interface node comprising one of the nodes on the ring interconnect and a memory controller external to the SoC and communicatively coupled to the link interface node via an interconnect link.

13. The method of claim 12, further comprising transferring memory READ request data corresponding to a memory READ request from the memory controller to the link interface node using at least one headerless packets.

14. The method of claim 11, further comprising employing a route-back table to effect routing of memory READ request data from a memory controller to a requesting entity that originates a corresponding memory READ request.

15. A computer system, comprising:
   A System on a Chip (SoC), comprising:
      a ring interconnect having a plurality of nodes;
      a plurality of processor cores, each operatively coupled to a respective node;
      a plurality of caching agents, each operatively coupled to a respective processor core;
      a plurality of last level cache (LLC) slices, each LLC slice associated with a respective caching agent;
      a plurality of home agents, each operatively coupled to a respective node and associated with a respective processor core;
      a first interconnect link interface, operatively coupled to a first interconnect interface node on the ring interconnect; and
   a first memory controller having a second interconnect link interface communicatively coupled to the first interconnect link interface via a first interconnect link.

16. The system of claim 15, wherein the first interconnect link interface employs a packet-based protocol to communicate with the memory controller.

17. The system of claim 16, wherein the packet-based protocol is based on the Keizer Technology Interconnect (KTI) protocol.

18. The system of claim 16, wherein the SoC supports memory transactions between the first interconnect link interface and the first memory controller using a packet-based protocol implementing headerless packets.

19. The system of claim 16, wherein the SoC further comprises a plurality of route-back tables, each containing information for routing memory transaction request data back to a home agent associated with a corresponding memory transaction.

20. The system of claim 19, wherein a route-hack table contains data including transaction identifiers that are encoded to identify at least one of a home agent or node to which the home agent is operatively coupled.

* * * * *